United States Patent Office 3,432,641
Patented Mar. 11, 1969

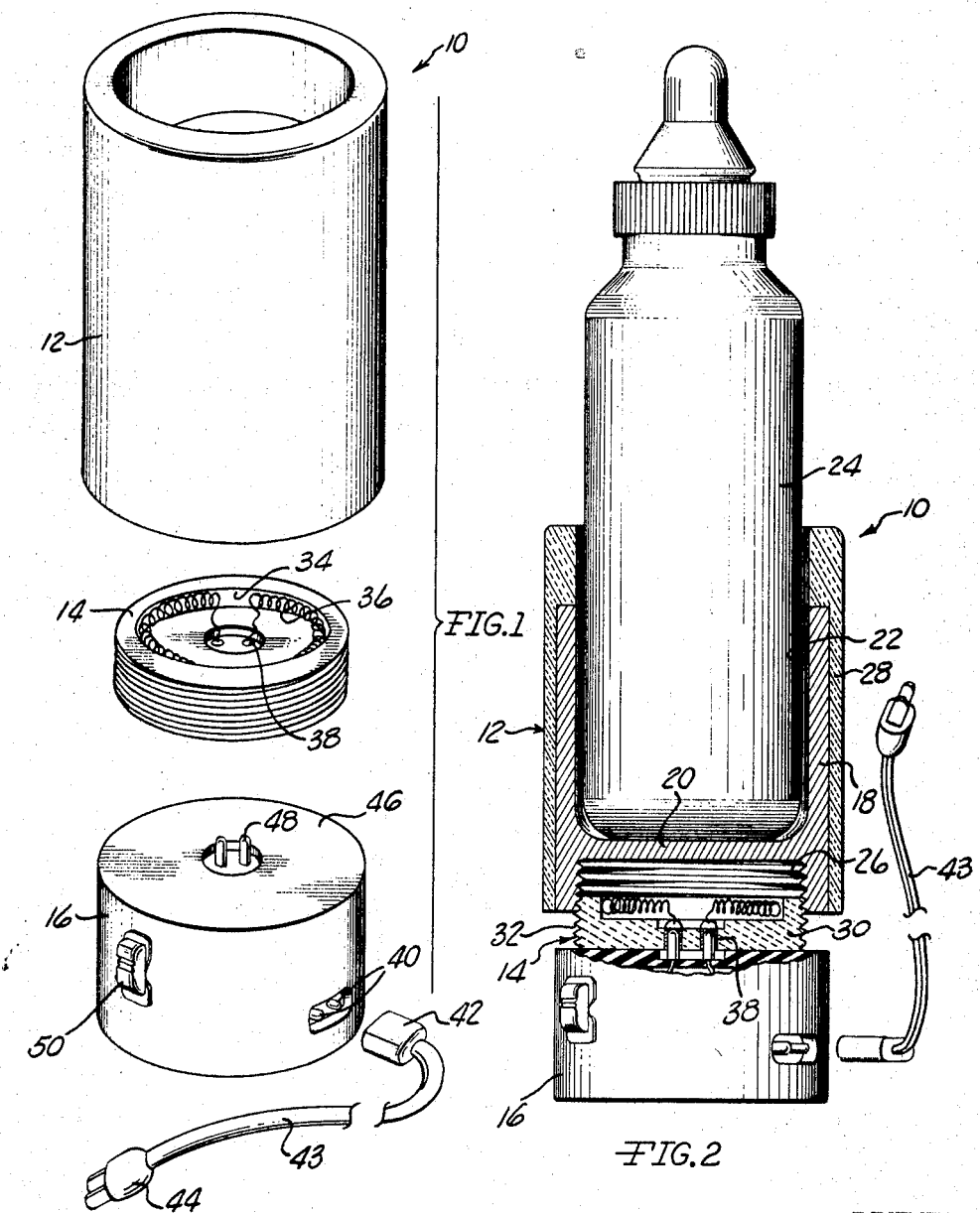

3,432,641
PORTABLE HEATING DEVICE
Robert J. Welke, 365 Helme Ave., Adrian, Mich. 49221
Filed Mar. 10, 1966, Ser. No. 533,370
U.S. Cl. 219—433
Int Cl. F27d 11/00
1 Claim

ABSTRACT OF THE DISCLOSURE

A portable baby bottle heating device consisting of three separable elements, namely, a container for receiving the baby bottle, a heat supply unit containing a heating element, and a power supply unit capable of energizing the heating element.

---

This invention relates generally to baby bottle warmers and more particularly to a portable heating device capable of being readily carried and transported in a handbag or the like for heating baby bottle contents or the contents of containers of a size similar to the size of conventional glass or the like baby bottles, and which can also be used to heat food and drink materials directly.

In modern society where parents are moving about more and more, there is an increasingly urgent need for a portable heating device capable of being carried in the purse or handbag for at any time quickly heating the contents of a baby bottle or the like. At the present time, articles such as baby bottles must be preheated to a temperature higher than the desired temperature at the time of use and then carried under conditions which will insulate the bottle as well as possible for future use. This procedure is completely unsatisfactory because the need for the bottle may arise prior to the time that it has cooled sufficiently or after the bottle contents are cold. In other instances, great inconveniences are incurred in taking the baby bottle to some permanent installation where it can be heated by means of hot water on a stove or by an electrical plug-in type heater. It is also desirable to have a baby bottle heater which can be used for heating other food and drink products so that the device has utility after the need for a baby bottle warmer no longer exists. It is an object of this invention, therefore, to provide an improved portable heating device which can readily be compactly transported and stored and used at any time to quickly heat a container such as a baby bottle, or food and drink products generally.

A further object of this invention is to provide a compact readily maintained heating device of the above type utilizing a "power pack" of the type consisting of small batteries which can be recharged by simple electrical connection to a wall outlet.

Further objects, features and advantages of this invention will become apparent from a consideration of the following description, the appended claims, and the accompanying drawing in which:

FIGURE 1 is an exploded perspective view of the heating device of this invention; and FIGURE 2 is a vertical sectional view of the heating device of this invention, shown in assembly relation with a baby bottle; and FIGURE 3 is a schematic diagram illustrating the electrical components in the heating device of this invention.

With reference to the drawing, the heating device of this invention, indicated generally at 10, is illustrated in FIG. 1 as consisting essentially of three component elements, namely, a container 12, a heat supply unit 14, and a power supply unit 16. The container 12 is generally cylindrical in configuration, having a tubular side wall 18 and a bottom wall 20. The container 12 is shaped so that it is provided on one side of the bottom wall 20 with a cavity 22 of a size to receive a conventional baby bottle 24 in a supported position on the bottom wall 20 in which the bottle 24 is close to the side wall 18. On the opposite side of the bottom wall 20, the container 12 is formed with a smaller internally threaded cavity 26 for a purpose to appear presently. The side wall 18 and the bottom wall 20 are formed of a heat conducting material, such as aluminum or steel. An exterior layer of a suitable insulting material 28 provides for a retention of the heat in the cavity 22, and extends upwardly beyond the upper end of the wall 18.

The heat supply unit 14 consists of a cylindrical ceramic block 30 provided with exterior threads 32 of a size to be threaded into the container cavity 26. One side of the block 30 is formed with a recess 34 in which one or more heating coils 36 are positioned. The illustrated heating coil 36 is connected at its ends to a socket 38 which extends through the other side of the block 30.

The power supply unit 16 is likewise generally cylindrical in shape, being only slightly larger in diameter than the ceramic block 30 and no larger in diameter than the container 12. The unit 16, commonly referred to as a "power pack," is not shown because it can be of the conventional type described in U.S. Patents 3,067,373 and 3,079,486. The power pack includes a rechargeable battery and a battery charging circuit including a rectifier R for enabling the battery to be charged from ordinary house current, as illustrated diagrammatically in FIG. 3. The unit 16 is connected to a first pair of prongs 48, which constitute a male fitting, which plug into the socket or female fitting 38. The unit 16 is also illustrated as having similar prongs 40 adapted to receive the socket 42 on a power cord 43 which is also provided with a plug 44 adapted to be plugged into any conventional wall socket when recharging of the power pack battery is desired. A slide switch 50, which cannot readily be accidentally moved when the device 10 is carried in a purse or the like, is also provided on the unit 16. When the switch 50 is moved to its "on" position, the unit 16 is capable of supplying sufficient electrical energy to energize the coils 36 with or without the cord 43 connected to the prongs 40 and a wall socket.

In the assembly of the device 10 of this invention, the ceramic block 30 is threaded into the cavity 26 in the container 18 so that the heating coil 36 is adjacent the container bottom wall 20, and the power unit 16 is manipulated so that the prongs 48 are plugged into the socket 38 in the ceramic block 30. When thus assembled, the heating device 10 is capable of heating the bottle 24 at any time by merely positioning the bottle in the container cavity 22 and turning the switch 50 on. At such time, the heating coils 36 are energized to heat the container bottom wall 20 and the side wall 18 to quickly heat the bottle 24 and its contents to the desired temperature. When not in use, the switch 50 is moved to "off" and the heating device can be readily carried in a purse or handbag. The three-piece construction of device 10 enables it to be readily disassembled for washing of container 12 and repair of units 14 and 16.

From the above description, it is seen that this invention provides a compact and exceedingly simple heating device 10 consisting of essentially the three elements 12, 14 and 16 shown in FIG. 1. The device 10 can readily be used at any time to provide heat for an object such as a baby bottle 24, it being only necessary to periodically recharge the power unit 16 by plugging it into a wall socket. In addition, the device 10 can be used to heat drink products, such as hot chocolate, coffee, etc., directly in the container 12. Since the insulation layer 28 extends beyond the upper end of the heat conducting wall 18 a distance sufficient to preclude mouth contact with wall 18 when drinking from container 12, such products can be drunk directly from container 12 which is thus usable also as an insulated glass. Other food products can also be heated directly in container 12, since it is readily detachable from unit 14 for cleaning, and eaten therefrom by use of a spoon or the like.

It will be understood that the portable heating device which is herein disclosed and described is presented for purposes of explanation and illustration and is not intended to indicate limits of the invention, the scope of which is defined by the following claim.

What is claimed is:

1. A heating device comprising an upright substantially cylindrical container having side walls and a bottom wall formed of a heat conducting material and shaped to form a first cavity on the upper side of said bottom wall and a second cavity on the opposite side of said bottom wall, a heat supply unit connected to said container and disposed on said opposite side of said bottom wall and projecting into said second cavity, a power supply unit capable of energizing said heat supply unit, said power supply unit being removably connected to and disposed adjacent said heat supply unit and wherein said container side wall is provided with an exterior insulation layer which extends above and is disposed on top of the upper end of said first cavity.

References Cited

UNITED STATES PATENTS

| 1,062,344 | 5/1913 | Mann | 219—436 |
| 2,277,605 | 3/1942 | Palitzsch | 219—436 X |
| 2,541,218 | 2/1951 | Doerr | 219—436 |
| 2,680,190 | 6/1954 | Schmidt | 219—432 |
| 2,700,097 | 1/1955 | Morey | 219—433 |
| 2,863,037 | 12/1958 | Johnstone | 219—432 |
| 3,067,373 | 12/1962 | Hopt et al. | 320—2 |
| 3,079,486 | 2/1963 | Winchell. | |
| 3,247,360 | 4/1966 | Ponder. | |
| 3,290,484 | 12/1966 | Day | 219—438 X |
| 2,476,113 | 7/1949 | Ranck | 219—438 |

FOREIGN PATENTS 447,699   7/1927   Germany.

ANTHONY BARTIS, *Primary Examiner.*

U.S. Cl. X.R.

219—415, 436, 521